United States Patent
Lepito et al.

(10) Patent No.: US 10,889,253 B1
(45) Date of Patent: Jan. 12, 2021

(54) WIRE HARNESS ASSEMBLY WITH OVERMOLDED BRACKET

(71) Applicant: Honda Motor Co., Ltd., Tokyo (JP)

(72) Inventors: Joseph S. Lepito, Marysville, OH (US); Akihiko Koike, Tochigi (JP); Nobuteru Fujii, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/783,708

(22) Filed: Feb. 6, 2020

(51) Int. Cl.
*B60R 16/02* (2006.01)
*H02G 1/06* (2006.01)

(52) U.S. Cl.
CPC .......... *B60R 16/0215* (2013.01); *H02G 1/06* (2013.01)

(58) Field of Classification Search
CPC ... H02G 1/06; H02G 3/32; H01B 7/40; B60R 16/0207; B60R 16/0215
See application file for complete search history.

(56) References Cited

U.S. PATENT DOCUMENTS

| | | | |
|---|---|---|---|
| 6,291,770 B1 | 9/2001 | Casperson | |
| 7,585,027 B2 | 9/2009 | Blendea | |
| 7,854,479 B2 | 12/2010 | Mundell | |
| 7,908,742 B2 | 3/2011 | Bedoe et al. | |
| 8,842,954 B2 | 9/2014 | Burris et al. | |
| 9,300,101 B2 | 3/2016 | Hayes et al. | |
| 9,720,185 B2 | 8/2017 | Halls et al. | |
| 10,003,177 B2 | 6/2018 | Nakashima et al. | |
| 2008/0175548 A1 | 7/2008 | Knecht et al. | |
| 2020/0059077 A1* | 2/2020 | Kim | B60R 16/02 |
| 2020/0168357 A1* | 5/2020 | Eshima | H01B 7/0045 |

FOREIGN PATENT DOCUMENTS

| | | |
|---|---|---|
| WO | 2006135725 | 12/2006 |
| WO | 2013035363 | 3/2013 |

\* cited by examiner

*Primary Examiner* — Timothy J Thompson
*Assistant Examiner* — Amol H Patel
(74) *Attorney, Agent, or Firm* — Rankin, Hill & Clark LLP

(57) ABSTRACT

A wire harness assembly includes a wire harness and a bracket fixedly secured to the wire harness by an overmold. The bracket includes a first wall fixedly secured to and facing the wire harness from a first radial angle with respect to a centerline of the wire harness such that a first wall normal line directed normal from the first wall intersects the centerline of the wire harness where the first wall is fixedly secured to the wire harness. The bracket also includes a second wall fixedly secured to and facing the wire harness from a second radial angle that is a different radial angle from the first radial angle with respect to the centerline of the wire harness such that a second wall normal line directed from the second wall intersects the centerline of the wire harness where the second wall is fixedly secured to the wire harness.

16 Claims, 12 Drawing Sheets

US 10,889,253 B1

WIRE HARNESS ASSEMBLY WITH OVERMOLDED BRACKET

BACKGROUND

Wire harnesses for electronic parking brakes require one or more brackets to attach the harness to a vehicle. These brackets configured for attaching wire harnesses to vehicles sometimes experience wear due to motion of a vehicle suspension system, exposure to moisture and debris, and freezing and thawing. Also, complex assembly procedures associated with brackets and wire harnesses add to a total manufacturing cost of the vehicle.

BRIEF DESCRIPTION

According to one aspect, a wire harness assembly includes a wire harness and a bracket fixedly secured to the wire harness by an overmold. The bracket includes a first wall fixedly secured to and facing the wire harness from a first radial angle with respect to a centerline of the wire harness such that a first wall normal line directed normal from the first wall intersects the centerline of the wire harness where the first wall is fixedly secured to the wire harness. A second wall is fixedly secured to and faces the wire harness from a second radial angle that is a different radial angle from the first radial angle with respect to the centerline of the wire harness such that a second wall normal line directed from the second wall intersects the centerline of the wire harness where the second wall is fixedly secured to the wire harness. An arm having a proximal end is connected to the first wall and continuous with a distal end of the arm, the distal end of the arm being connected to the second wall such that the arm is interposed between and separates the first wall from the second wall. A bend in the arm between the proximal end and the distal end orients the first wall and the second wall toward facing the wire harness. The overmold encompasses at least a portion of the first wall including a first wall periphery and at least one of a lateral face of the first wall and a medial face of the first wall. The overmold encompasses at least a portion of the second wall including a second wall periphery and at least one of a lateral face of the second wall and a medial face of the second wall. The overmold encompasses at least a portion of the arm. The overmold encompasses the wire harness where the bracket is fixedly secured to the wire harness by the overmold.

According to another aspect, a wire harness assembly includes a wire harness and a bracket fixedly secured to the wire harness by an overmold. The bracket includes a first wall fixedly secured to the wire harness and facing the wire harness from a first radial angle with respect to a centerline of the wire harness such that a first wall normal line directed normal from the first wall intersects the centerline of the wire harness where the first wall is fixedly secured to the wire harness. The bracket also includes a second wall fixedly secured to the wire harness and facing the wire harness from a second radial angle that is a different radial angle from the first radial angle with respect to the centerline of the wire harness such that a second wall normal line directed from the second wall intersects the centerline of the wire harness where the second wall is fixedly secured to the wire harness. The first wall and the second wall are disposed on opposite sides of a longitudinal plane oriented longitudinally with respect to the wire harness and bisecting the wire harness where the bracket is fixedly secured on the wire harness.

According to another aspect, a method of fixedly securing a bracket onto a wire harness includes fixedly securing a first wall of the bracket to the wire harness with an overmold, and fixedly securing a second wall of the bracket to the wire harness with the overmold, the first wall and the second wall being disposed on opposite sides of a longitudinal plane oriented longitudinally with respect to the wire harness and bisecting the wire harness where the bracket is overmolded on the wire harness.

DETAILED DESCRIPTION

Figure 1:
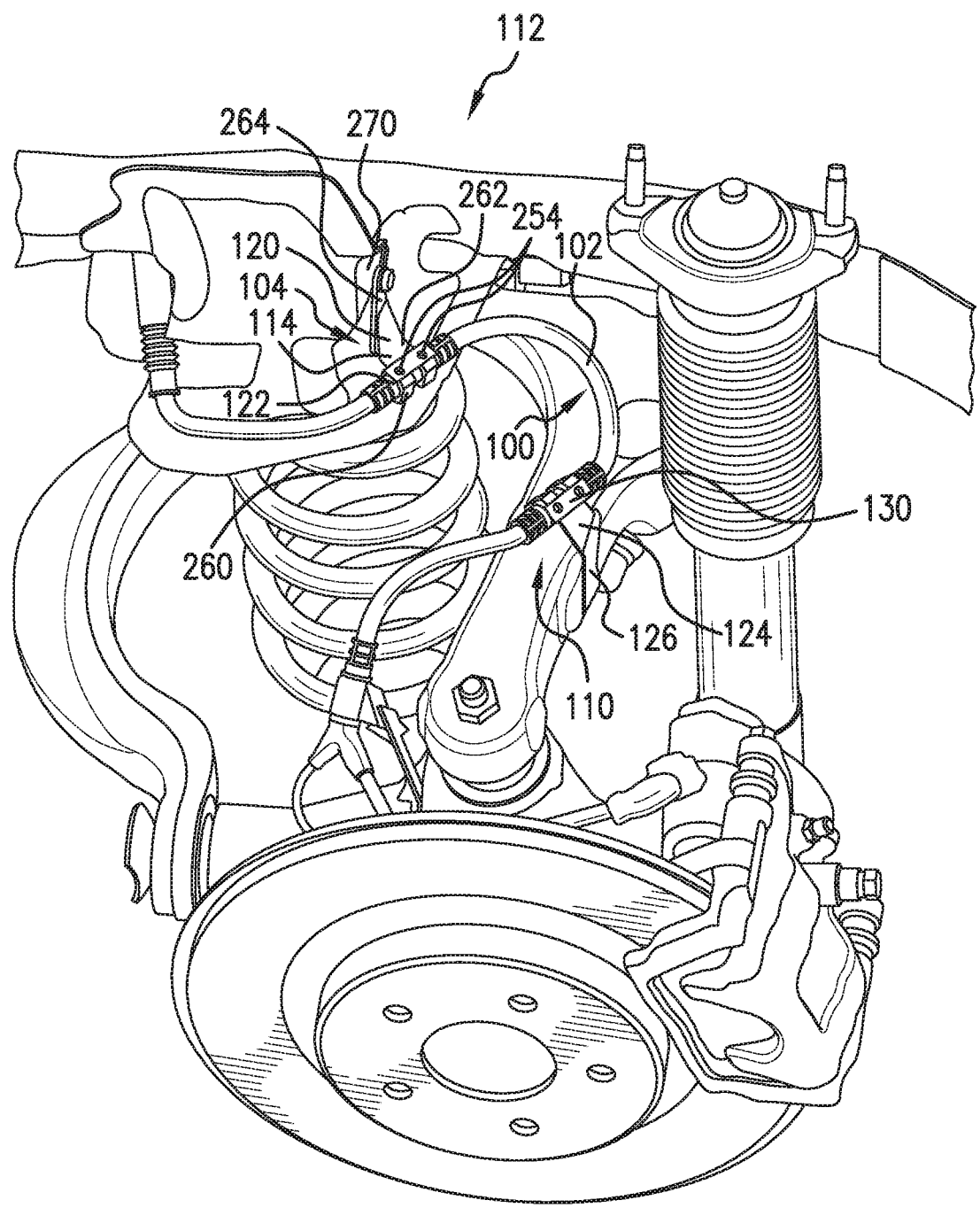
FIG. 1 is a perspective view of a wire harness assembly mounted to a vehicle.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts a wire harness assembly 100 including a wire harness 102, a first fixture 104, and a second fixture 110. As depicted, the first fixture 104 and the second fixture 110 are configured for connecting the wire harness 102 to a portion of a vehicle 112. While the depicted wire harness assembly 100 includes the two fixtures 104, 110 for attaching the wire harness 102, additional or fewer such fixtures may be incorporated into the wire harness assembly 100 without departing from the scope of the present disclosure. Furthermore, while FIG. 1 depicts the wire harness assembly 100 as part of an electronic parking brake, the wire harness assembly 100 could be adapted for other or additional applications such as an anti-lock braking system (ABS) of the vehicle 112.

Figure 2:
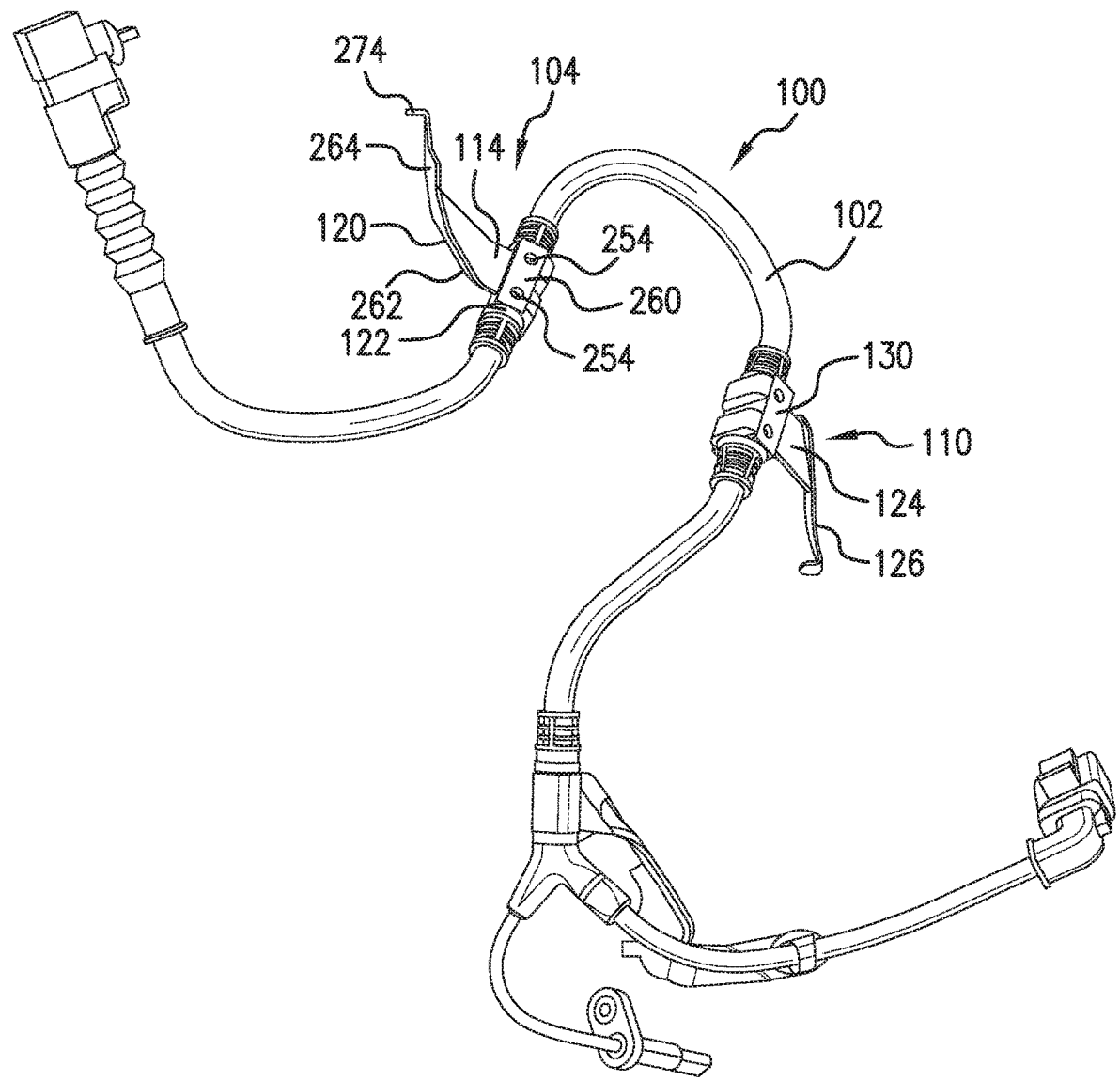
FIG. 2 is a perspective view of the wire harness assembly of FIG. 1.

As depicted in FIG. 2, the first fixture 104 includes a bracket 114 having an attachment portion 120 extending from the bracket 114 and configured for attaching the bracket 114 to the vehicle 112, with the bracket 114 fixedly secured to the wire harness 102 with an overmold 122. Similarly, the second fixture 110 includes a bracket 124 having an attachment portion 126 extending from the bracket 124 and configured for attaching the bracket 124 to the vehicle 112, with the bracket 124 fixedly secured to the wire harness 102 with an overmold 130. Having a similar construction, disclosure directed to the first fixture 104 depicted in FIGS. 3-11 is applicable to the second fixture 110.

Figure 3:
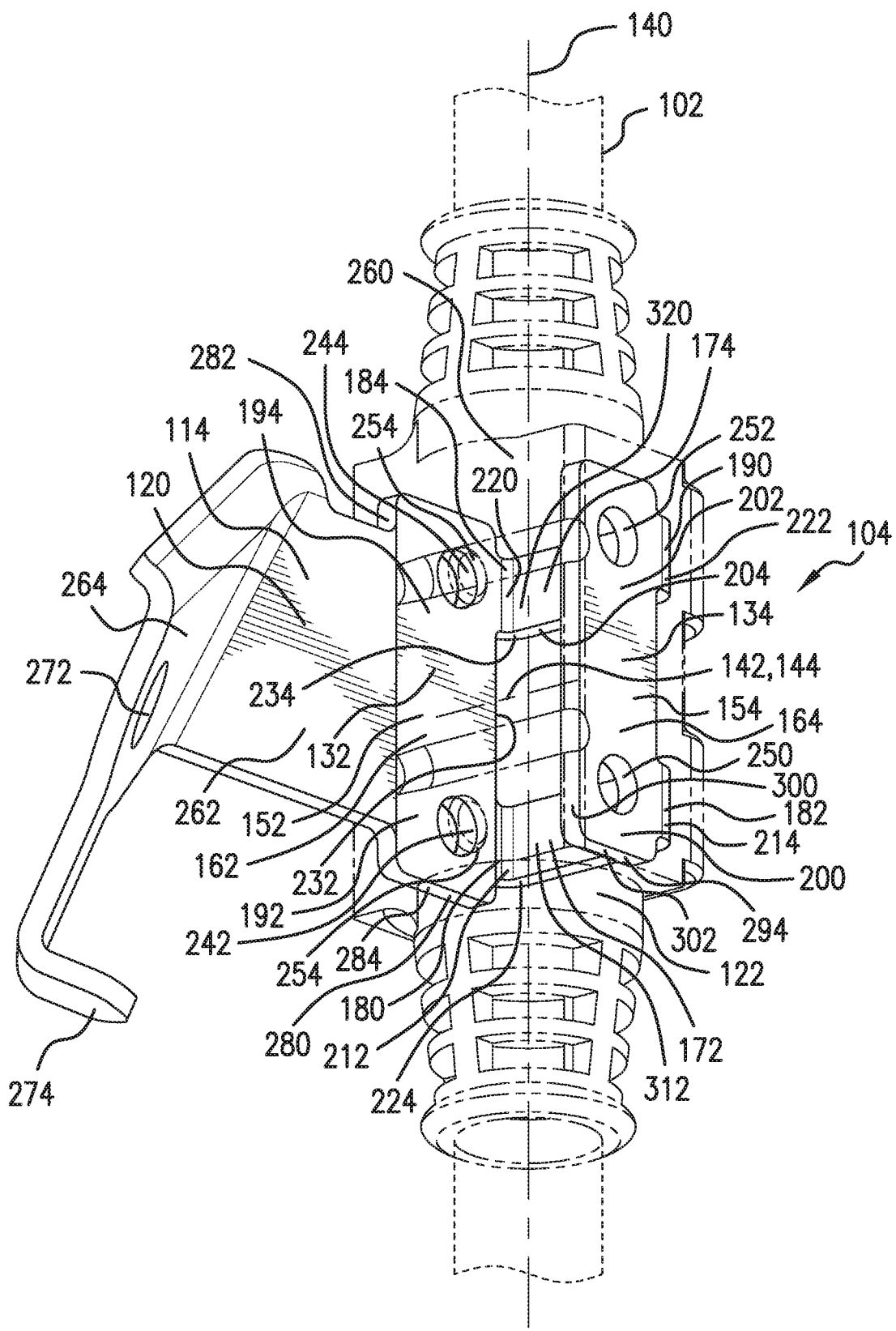
FIG. 3 is a perspective view of a fixture of the wire harness assembly.
Figure 4:
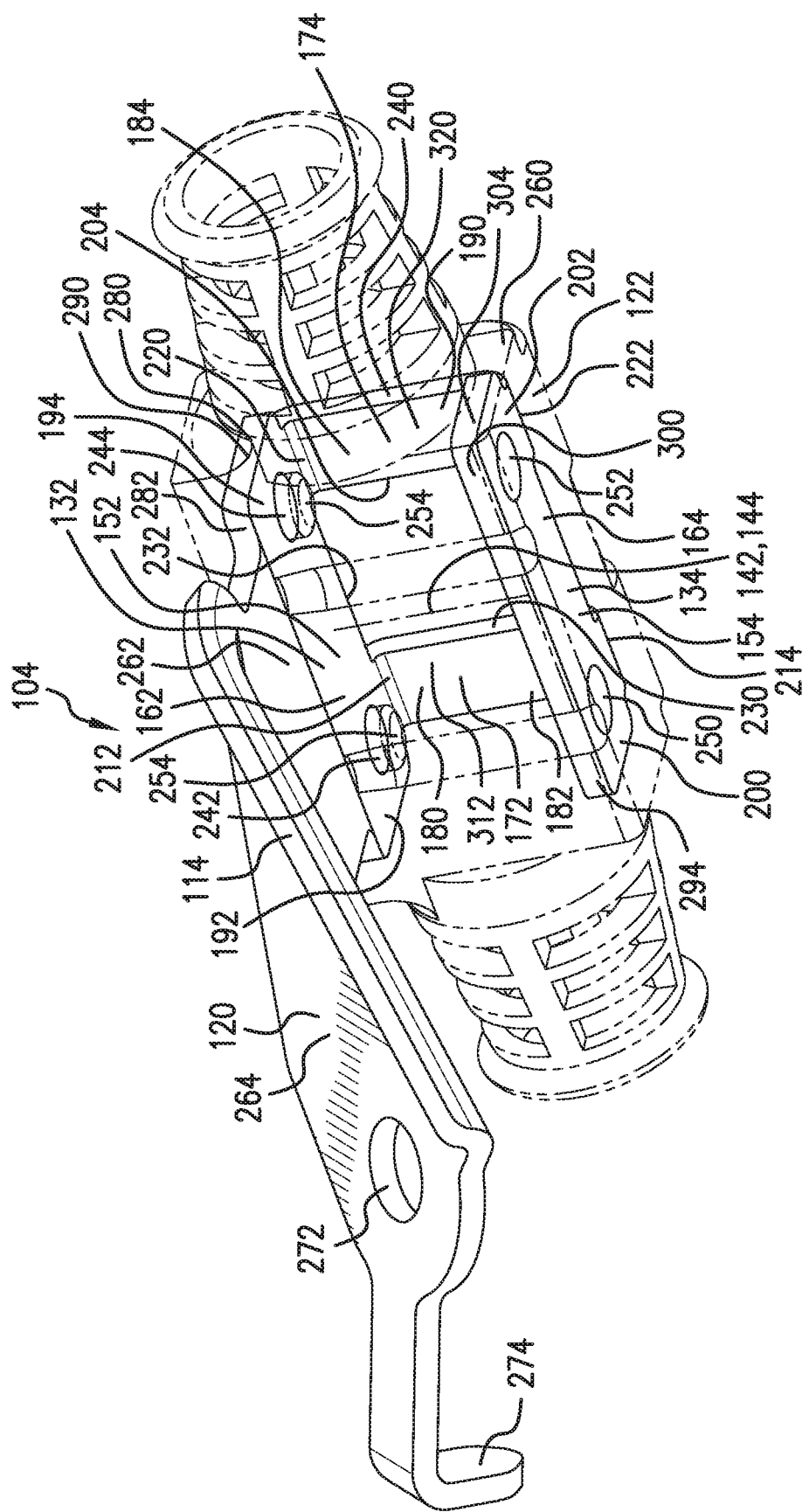
FIG. 4 is a perspective view of the fixture of the wire harness assembly.

As depicted in FIGS. 3 and 4, the bracket 114 of the first fixture 104 includes a first wall 132 and a second wall 134. Each of the first wall 132 and the second wall 134 is shaped as a flat plate. The first wall 132 and the second wall 134 are oriented in parallel and located such that the first wall 132 faces the second wall 134. The first wall 132 and the second wall 134 are offset a lateral distance of the bracket 114 sufficient to define a space between the first wall 132 and the second wall 134 capable of receiving the wire harness 102.

The overmold 122 encompasses the first wall 132 and the wire harness 102 such that the first wall 132 is fixedly secured to and faces the wire harness 102 from a first radial angle with respect to a centerline 140 of the wire harness 102. The first radial angle is defined by a first wall normal line 142 which is directed normal from the first wall 132 and intersects the centerline 140 of the wire harness 102 where the first wall 132 is fixedly secured to the wire harness 102. The overmold 122 encompasses the second wall 134 and the wire harness 102 such that the second wall 134 is fixedly secured to and faces the wire harness 102 from a second radial angle that is a different radial angle from the first radial angle. The second radial angle is defined by a second wall normal line 144 which is directed normal from the second wall 134 and intersects the centerline 140 of the wire harness 102. With this construction, the second wall normal line 144 intersects the centerline 140 of the wire harness 102 where the second wall 134 is fixedly secured to the wire harness 102.

Figure 8:
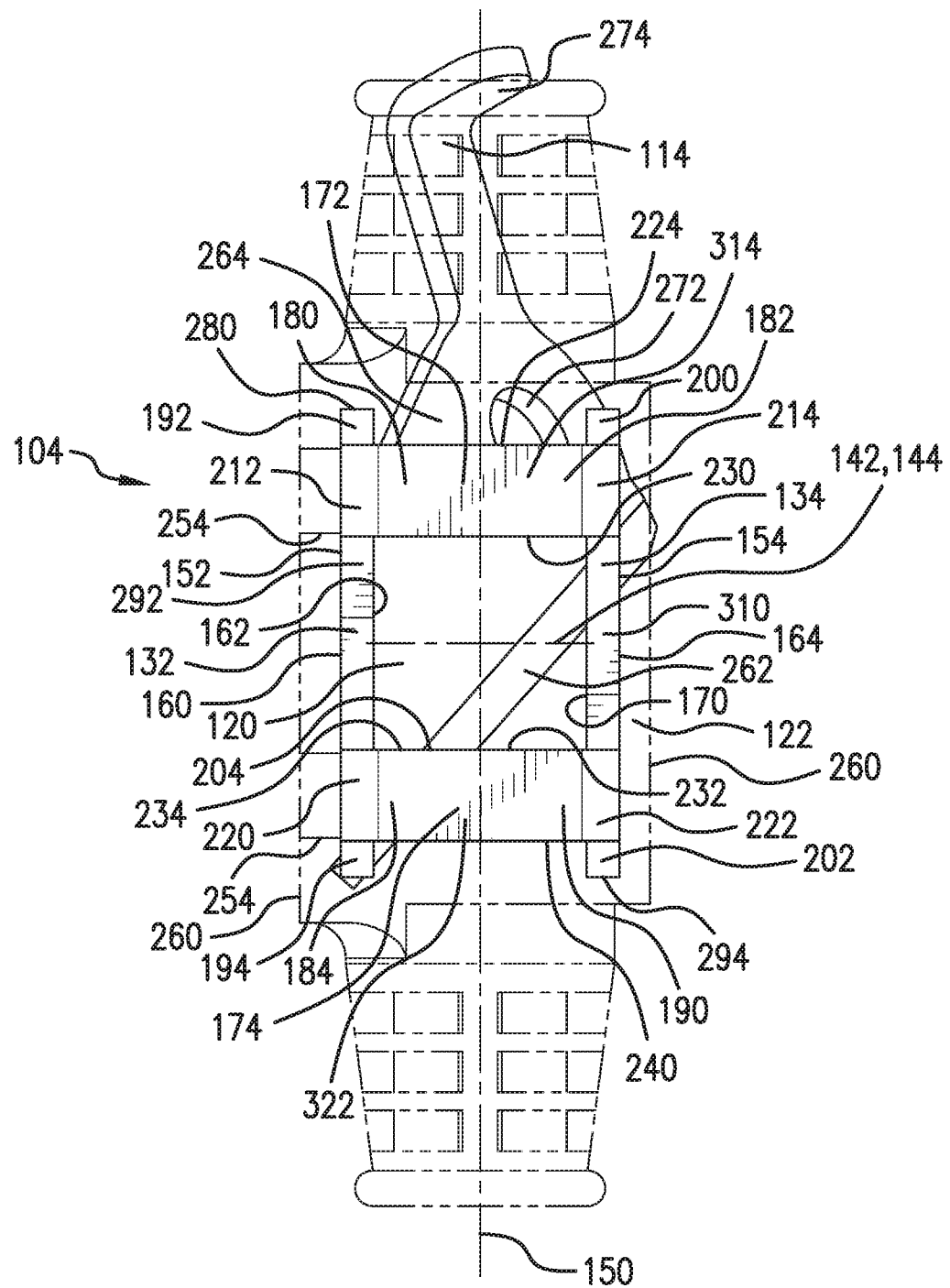
FIG. 8 is a bottom view of the fixture of the wire harness assembly.
Figure 9:
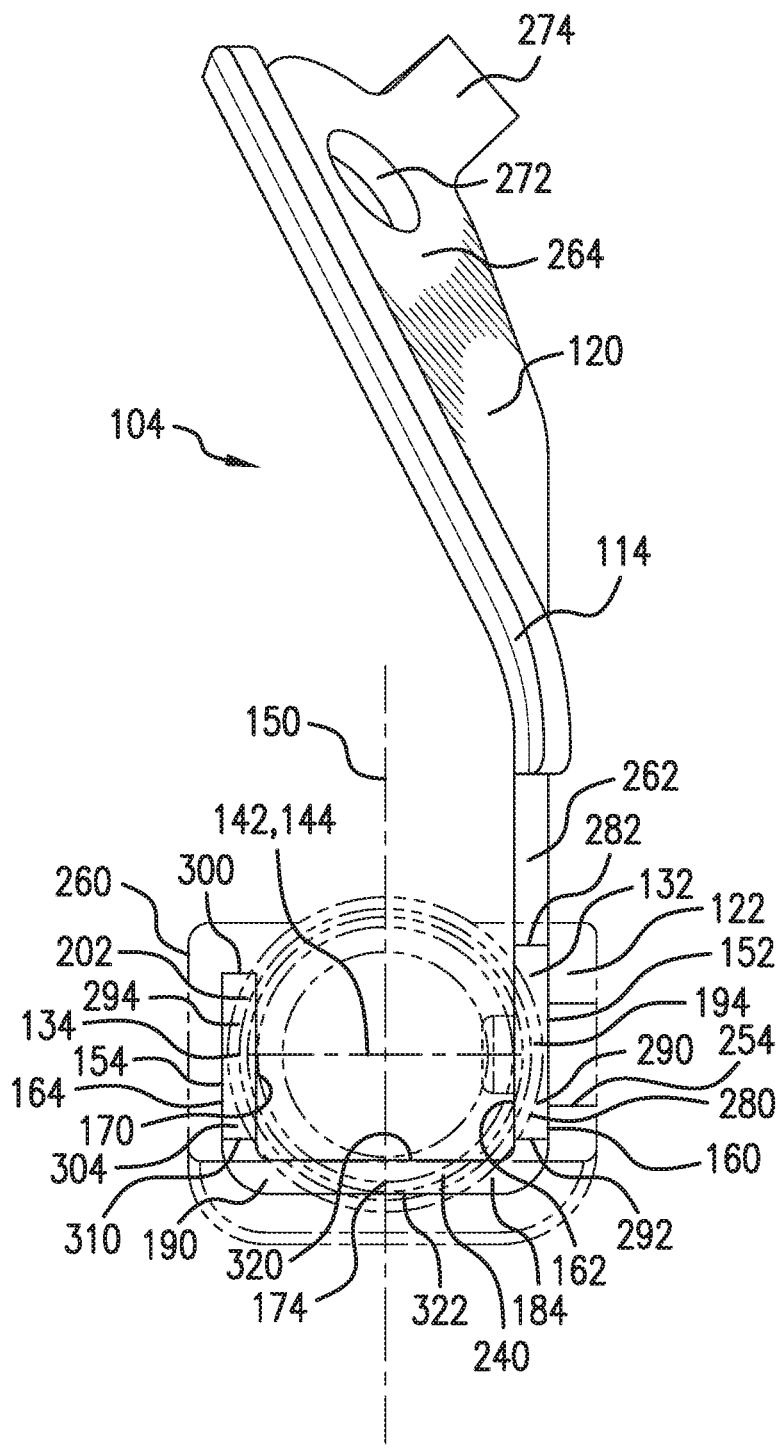
FIG. 9 is a front view of the fixture of the wire harness assembly.
Figure 11:
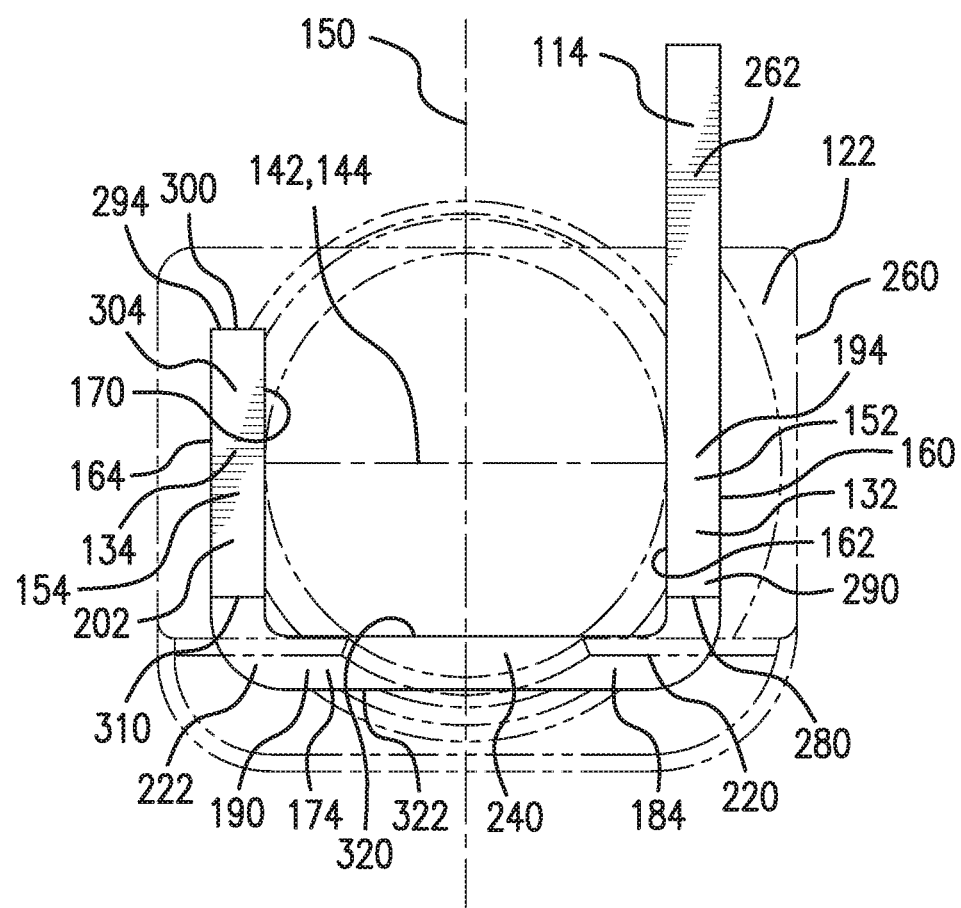
FIG. 11 is a partial perspective view of a bracket of the wire harness assembly.

As depicted in FIGS. 8, 9, and 11, the first wall 132 and the second wall 134 are disposed on opposite sides of a longitudinal plane 150. The longitudinal plane 150 is oriented longitudinally with respect to the bracket 114, and oriented longitudinally with respect to the wire harness 102, and bisects the wire harness 102 where the bracket 114 is fixedly secured on the wire harness when the bracket 114 is assembled with the wire harness 102. Specifically, the first wall 132 and the second wall 134 are disposed facing opposite lateral sides of the wire harness 102 at a same longitudinal position of the wire harness 102. Consequently, the first wall normal line 142 and the second wall normal line 144 are collinear, projected in opposite directions, and intersect a same point of the centerline 140 of the wire harness 102.

Figure 5:
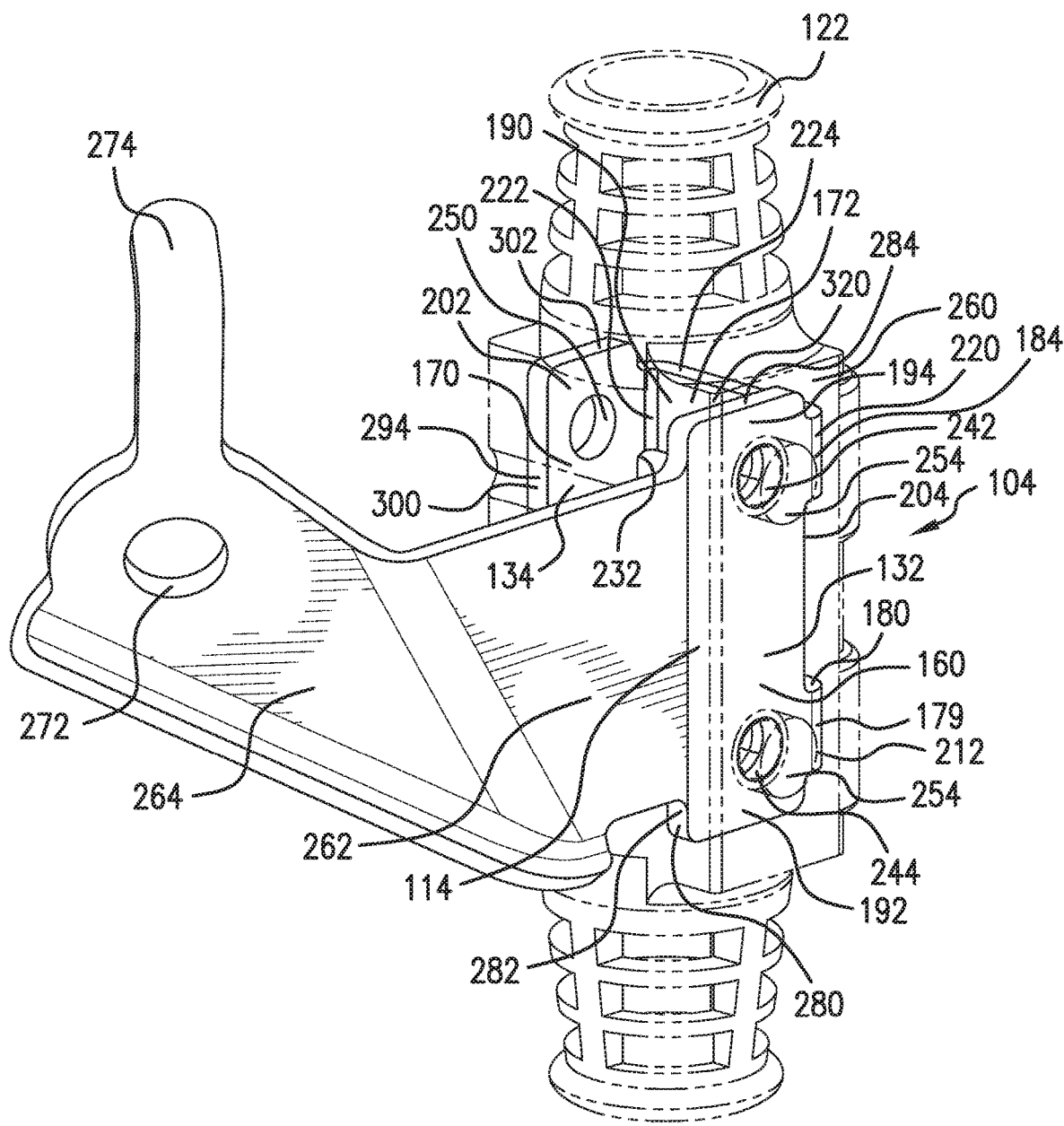
FIG. 5 is a perspective view of the fixture of the wire harness assembly.

The first wall normal line 142 extends from a flat section 152 of the first wall 132, and the second wall normal line 144 extends from a flat section 154 of the second wall 134. With this construction, the flat section 152 of the first wall 132 includes a lateral face 160 and a medial face 162 with respect to the wire harness 102. Because, as depicted in FIG. 3, the overmold 122 encompasses the first wall 132 and the wire harness 102, including the flat section 152 of the first wall 132, the overmold 122 is configured to transfer radial forces between the wire harness 102 and the flat section 152 of the first wall 132. Similarly, the flat section 154 of the second wall 134 includes a lateral face 164 and a medial face 170 with respect to the wire harness 102. Because, as depicted in FIGS. 3 and 5, the overmold 122 encompasses the second wall 134 and the wire harness 102, including the flat section 154 of the second wall 134, the overmold 122 is configured to transfer radial forces between the wire harness 102 and the flat section 154 of the second wall 134.

Figure 6:
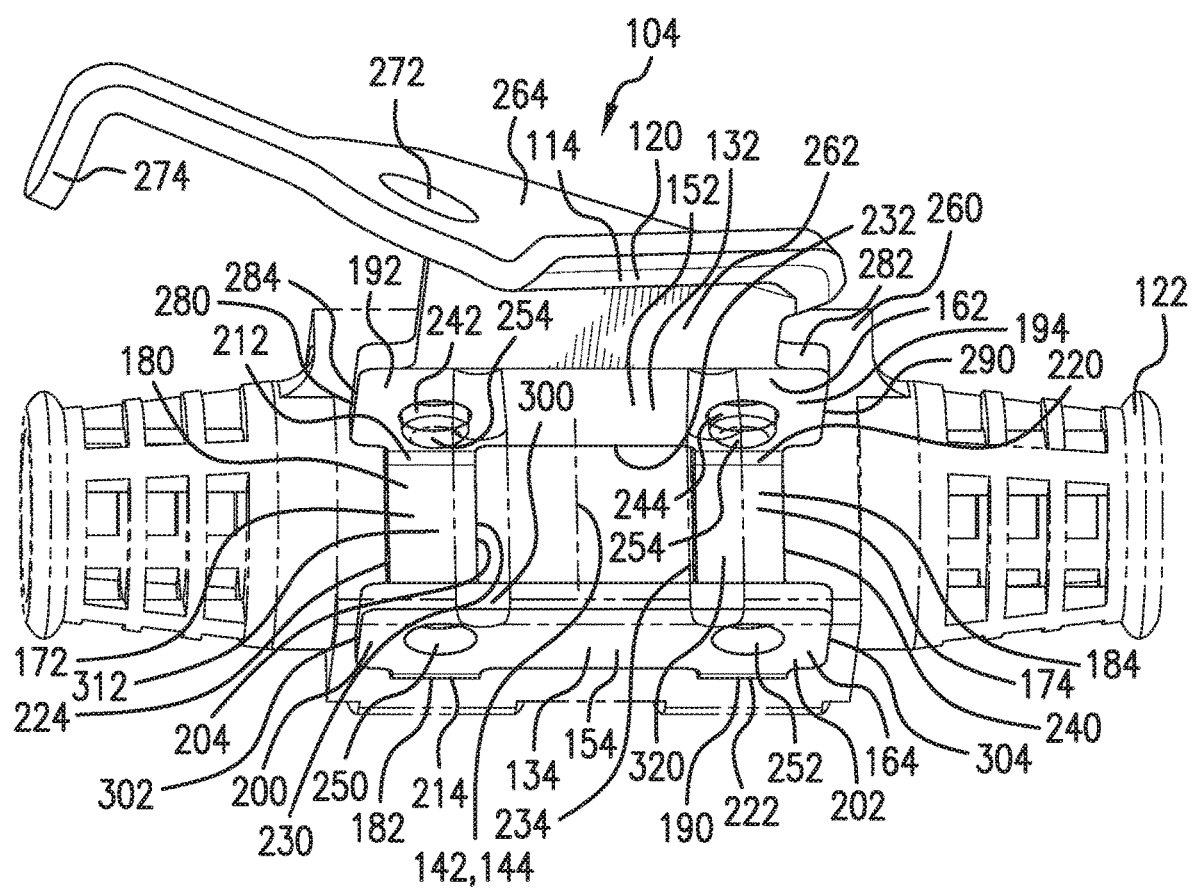
FIG. 6 is a perspective view of the fixture of the wire harness assembly.

As depicted in FIG. 6, the bracket 114 includes a first arm 172 and a second arm 174 connecting the first wall 132 and the second wall 134. The first wall 132, the second wall 134, the first arm 172, and the second arm 174 are integrally formed from a single piece of material and together form a U-shaped portion of the bracket 114 which defines a space capable of receiving the wire harness 102. The shape of the bracket 114 increases an external surface area of the bracket 114 encompassed by the overmold 122 in four different directions including upward, downward, forward, and backward with respect to the wire harness 102 to better prevent the overmold 122 from separating from the bracket 114. Notably, while the depicted bracket 114 includes two arms that are the first arm 172 and the second arm 174, the bracket 114 could incorporate more or fewer similar arms for connecting the first wall 132 and the second wall 134 without departing from the scope of the present disclosure.

The first arm 172 has a proximal end 180 that is connected to the first wall 132 and continuous with a distal end 182 of the first arm 172. The distal end 182 of the first arm 172 is connected to the second wall 134 such that the first arm 172 is interposed between and separates the first wall 132 from the second wall 134. Similarly, the second arm 174 has a proximal end 184 that is connected to the first wall 132 and continuous with a distal end 190 of the second arm 174, and the distal end 190 of the second arm 174 is connected to the second wall 134 such that the second arm 174 is interposed between and separates the first wall 132 from the second wall 134.

The first wall 132 includes a first longitudinal end portion 192 and a second longitudinal end portion 194 disposed on a side of the bracket 114 opposite the first longitudinal end portion 192 with respect to a longitudinal length of the bracket 114, which is aligned with a longitudinal length of the wire harness 102 where the bracket 114 is fixedly secured to the wire harness 102. Similarly, the second wall 134 includes a first longitudinal end portion 200 and a second longitudinal end portion 202 disposed on a side of the bracket 114 opposite the first longitudinal end portion 200 with respect to the longitudinal length of the bracket 114. The first arm 172 connects the first longitudinal end portion 192 of the first wall 132 with the first longitudinal end portion 200 of the second wall 134, and the second arm 174 connects the second longitudinal end portion 194 of the first wall 132 and the second longitudinal end portion 202 of the second wall 134.

Figure 7:
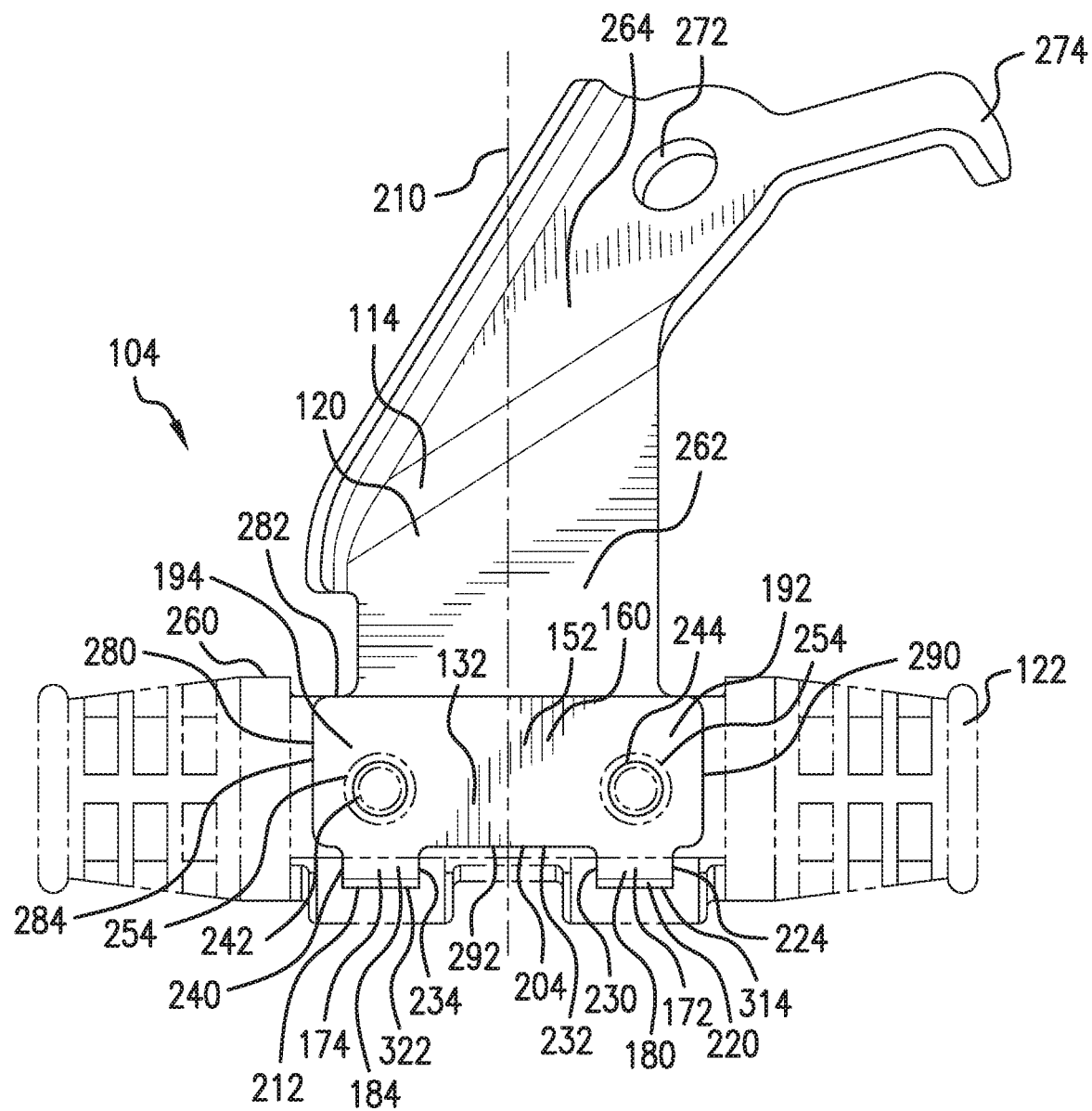
FIG. 7 is a side view of the fixture of the wire harness assembly.

The second arm 174 is spaced from the first arm 172 along the longitudinal length of the bracket 114, defining a cutout section 204 between the first arm 172 and the second arm 174 along the longitudinal length of the bracket 114. As shown in FIG. 7, the first arm 172 and the second arm 174 are located on opposite sides of a lateral plane 210 oriented laterally with respect to the bracket 114, and oriented laterally with respect to the wire harness 102 when the bracket 114 is assembled with the wire harness 102. The lateral plane 210 bisects the first wall 132 and the second wall 134 along the longitudinal length of the wire harness 102 such that the cutout section 204 spans the lateral plane 210 when the wire harness 102 is assembled with the bracket 114. As such, the cutout section 204 spans a middle point of at least one of the first wall 132 and the second wall 134 along the longitudinal length of the bracket 114.

As depicted in FIGS. 8-11, the first arm 172 includes a first bend 212 and a second bend 214 between the proximal end 180 of the first arm 172 and the distal end 182 of the first arm 172. Similarly, the second arm 174 includes a first bend 220 and a second bend 222 between the proximal end 184 of the second arm 174 and the distal end 190 of the second arm 174. The first bend 212 and the second bend 214 in the first arm 172, and the first bend 220 and the second bend 222 in the second arm 174 respectively orient the first wall 132 and the second wall 134 toward facing the wire harness 102.

The first wall 132 and the second wall 134 are flat plates, where the first wall 132 extends straight from the proximal end 180 of the first arm 172 and the proximal end 180 of the second arm 174, and the second wall 134 extends straight from the distal end 182 of the first arm 172 and the distal end 190 of the second arm 174. In this manner, the first arm 172 and the second arm 174 each respectively continue a direction of the first arm 172 and the second arm 174.

With this construction, as depicted in FIG. 8, the first bend 212 and the second bend 214 in the first arm 172 offset the proximal end 180 of the first arm 172 from the distal end 182 of the first arm 172 by an angle that is equal in magnitude to a difference between the first radial angle and the second radial angle with respect to the centerline 140 of the wire harness 102. Similarly, the first bend 220 and the second bend 222 in the second arm 174 offset the proximal end 184 of the second arm 174 from the distal end 190 of the second arm 174 by an angle that is equal in magnitude to a difference between the first radial angle and the second radial angle with respect to the centerline 140 of the wire harness 102. In the depicted embodiment, each of the first bend 212 and the second bend 214 of the first arm 172, and the first bend 220 and the second bend 222 of the second arm 174 are formed at approximate 90 degree angles, such that the difference in the first radial angle and the second radial angle is 180 degrees.

As depicted in FIG. 8, the first arm 172 includes a front face 224 oriented normal to the longitudinal direction of the bracket 114, and a back face 230 that defines a perimeter 232 of the cutout section 204 and is oriented normal to the longitudinal direction of the bracket 114. Because the front face 224 and the back face 230 of the first arm 172 are oriented normal to the longitudinal direction of the bracket 114, and the overmold 122 encompasses the first arm 172 and the wire harness 102, the overmold 122 is configured for transferring forces between the first arm 172 and the wire harness 102 in the longitudinal direction of the bracket 114.

Similarly, the second arm 174 includes a front face 234 that defines the perimeter 232 of the cutout section 204 and is oriented normal to the longitudinal direction of the bracket 114, and a back face 240 that is oriented normal to the longitudinal direction of the bracket 114. Because the front face 234 and the back face 240 of the second arm 174 are oriented normal to the longitudinal direction of the bracket 114, and the overmold 122 encompasses the second arm 174 and the wire harness 102, the overmold 122 is configured for transferring forces between the second arm 174 and the wire harness 102 in the longitudinal direction of the bracket 114.

Figure 10:
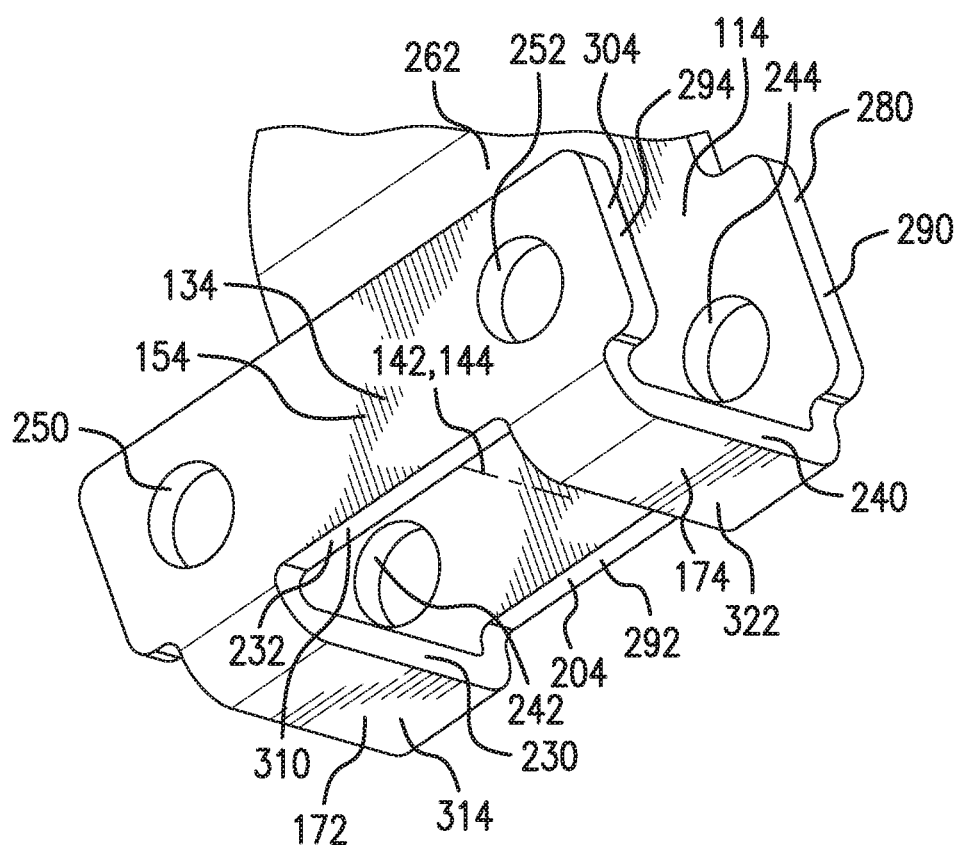
FIG. 10 is a partial front view of the fixture of the wire harness assembly.

With reference to FIG. 10, the first wall 132 defines a first plurality of holes including a first hole 242 and a second hole 244. As shown, each of the first hole 242 and the second hole 244 extends though the first wall 132 from the lateral face 160 of the first wall 132 to the medial face 162 of the first wall 132. The second wall 134 defines a second plurality of holes including a first hole 250 and a second hole 252. As shown, each of the first hole 250 and the second hole 252 extends through the second wall 134 from the lateral face 160 of the first wall 132 to the medial face 162 of the first wall 132. Notably, the first plurality of holes and the second plurality of holes may include more or fewer holes without departing from the present disclosure.

As illustrated in FIG. 6, the overmold 122 extends into the first hole 242 and the second hole 244 of the second plurality of holes, forming an interlock between the overmold 122 and the bracket 114 at each of the first hole 242 and the second hole 244 of the second plurality of holes. As further depicted, the overmold 122 defines pin holes 254 respectively corresponding with the first plurality of holes, the pin holes 254 extending from an exterior surface 260 of the overmold 122 through the first plurality of holes and beyond the medial face 162 of the first wall 132. The pin holes 254 are created from an injection molding process used to form the overmold 122, and in alternative embodiments the pin holes 254 are located elsewhere in the overmold 122 such that the first hole 242 and the second hole 244 of the first plurality of holes form interlocks with the overmold in addition, or alternative to the interlocks formed between the second plurality of holes and the overmold 122.

In FIG. 1, the attachment portion 120 extends from the bracket 114 and is configured for attaching the bracket 114 to the vehicle 112. The attachment portion 120 is bent between a proximal end portion 262 and a distal end portion 264 of the attachment portion 120 such that the proximal end portion 262 is configured to extend from the wire harness 102 toward an attachment surface 270 of the vehicle 112, and the distal end portion 264 of the attachment portion 120 is oriented such that the distal end portion 264 of the attachment portion 120 is mated with the attachment surface 270 of the vehicle 112. In FIGS. 7-9, the attachment portion 120 extends from the first wall 132, however the attachment portion 120 may alternatively extend from the second wall 134 without departing from the present disclosure.

Further shown, a mounting aperture 272 is defined in the distal end portion 264 of the attachment portion 120, and is configured for receiving attachment means such as a bolt for fixing the attachment portion 120 to the vehicle 112. A flange 274 extends from the distal end portion 264 of the attachment portion 120 and is configured for being located on the vehicle 112 so as to prevent the bracket 114 from rotating about the mounting aperture 272 with respect to the vehicle 112. The flange 274 extends from the attachment portion 120 and is bent between the attachment portion 120 and a distal end of the flange 274.

The overmold 122 encompasses the first wall 132, the second wall 134, the first arm 172, the second arm 174, and the wire harness 102 where the bracket 114 is fixedly secured to the wire harness 102 by the overmold 122. Therefore, the overmold 122 is configured to transfer force between exterior surfaces of the first wall 132, the second wall 134, the first arm 172, the second arm 174, and the wire harness 102. All portions of the overmold 122 are integrally formed with each other from a single material. Notably, exterior surfaces of the bracket 114 encompassed by the overmold 122 and oriented normal to a force applied between the bracket 114 and the wire harness 102 are obstructed from movement relative to the wire harness 102 by the overmold 122.

With reference to FIG. 7, the overmold 122 encompasses at least a portion of the first wall 132 including a first wall periphery 280, the lateral face 160 of the first wall 132, and the medial face 162 of the first wall 132. A top face 282 of the first wall periphery 280 is oriented vertically upward, normal to the longitudinal direction of the bracket 114 such that when a force between the bracket 114 and the wire harness 102 directs the bracket 114 upward relative to the wire harness 102, the overmold 122 obstructs upward movement of the bracket 114 relative to the wire harness 102 through the top face 282 of the first wall periphery 280. The first wall periphery 280 includes a front face 284 oriented forward in the longitudinal direction of the bracket 114 such that when a force between the bracket 114 and the wire harness 102 directs the bracket 114 forward relative to the wire harness 102, the overmold 122 obstructs forward movement of the bracket 114 relative to the wire harness 102 through the front face 284 of the first wall periphery 280. The first wall periphery 280 includes a back face 290 oriented backward in the longitudinal direction of the bracket 114 such that when a force between the bracket 114 and the wire harness 102 directs the bracket 114 backward relative to the wire harness 102, the overmold 122 obstructs backward movement of the bracket 114 relative to the wire harness 102 through the back face 290 of the first wall periphery 280. The first wall periphery 280 includes a bottom face 292 oriented vertically downward, normal to the longitudinal direction of the bracket 114 such that when a force between the bracket 114 and the wire harness 102 directs the bracket 114 downward relative to the wire harness 102, the overmold 122 obstructs downward movement of the bracket 114 relative to the wire harness 102 through the bottom face 292 of the first wall periphery 280.

As depicted in FIG. 8, the medial face 162 of the first wall 132 is oriented laterally inward with respect to the longitudinal direction of the bracket 114 such that when a force between the bracket 114 and the wire harness 102 directs the bracket 114 laterally inward relative to the wire harness 102, the overmold 122 obstructs movement of the bracket 114 laterally inward relative to the wire harness 102 through the medial face 162 of the first wall 132. The lateral face 160 of the first wall 132 is oriented laterally outward with respect to the longitudinal direction of the bracket 114 such that when a force between the bracket 114 and the wire harness 102 directs the bracket 114 laterally outward relative to the wire harness 102, the overmold 122 obstructs laterally outward movement of the bracket 114 relative to the wire harness 102 through the lateral face 160 of the first wall 132.

The overmold 122 encompasses at least a portion of the second wall 134 including a second wall periphery 294, the lateral face 164 of the second wall 134, and the medial face 170 of the second wall 134. As depicted in FIG. 9, a top face 300 of the second wall periphery 294 is oriented vertically upward, normal to the longitudinal direction of the bracket 114 such that when a force between the bracket 114 and the wire harness 102 directs the bracket 114 upward, the overmold 122 obstructs upward movement of the bracket 114 relative to the wire harness 102 through the top face 300 of the second wall periphery 294. As depicted in FIG. 6, the second wall periphery 294 includes a front face 302 oriented forward in the longitudinal direction of the bracket 114 such that when a force between the bracket 114 and the wire harness 102 directs the bracket 114 forward relative to the wire harness 102, the overmold 122 obstructs forward movement of the bracket 114 relative to the wire harness 102 through the front face 302 of the second wall periphery 294. As shown in FIG. 9, the second wall periphery 294 includes a back face 304 oriented backward in the longitudinal direction of the bracket 114 such that when a force between the bracket 114 and the wire harness 102 directs the bracket 114 backward relative to the wire harness 102, the overmold 122 obstructs backward movement of the bracket 114 relative to the wire harness 102 through the back face 304 of the second wall periphery 294. As depicted in FIG. 8, the second wall periphery 294 includes a bottom face 310 oriented vertically downward, normal to the longitudinal direction of the bracket 114 such that when a force between the bracket 114 and the wire harness 102 directs the bracket 114 downward relative to the wire harness 102, the overmold 122 obstructs downward movement of the bracket 114 relative to the wire harness 102 through the bottom face 310 of the second wall periphery 294.

The medial face 170 of the second wall 134 is oriented laterally inward with respect to the longitudinal direction of the bracket 114 such that when a force between the bracket 114 and the wire harness 102 directs the bracket 114 laterally inward relative to the wire harness 102, the overmold 122 obstructs movement of the bracket 114 laterally inward relative to the wire harness 102 through the medial face 170 of the second wall 134. The lateral face 164 of the second wall 134 is oriented laterally outward with respect to the longitudinal direction of the bracket 114 such that when a force between the bracket 114 and the wire harness 102 directs the bracket 114 laterally outward relative to the wire harness 102, the overmold 122 obstructs laterally outward movement of the bracket 114 relative to the wire harness 102 through the lateral face 164 of the second wall 134.

The overmold 122 encompasses at least a portion of the first arm 172 and at least a portion of the second arm 174. The overmold 122 also extends into the cutout section 204. This, in turn, creates an interlock between the overmold 122 and the bracket 114 at the cutout section 204 where the overmold 122 is disposed around each of the first arm 172 and the second arm 174 through the cutout section 204 and around the front face 224 of the first arm 172 and the back face 240 of the second arm 174.

As depicted in FIG. 6, the first arm 172 includes a top face 312 oriented vertically upward, normal to the longitudinal direction of the bracket 114 such that when a force between the bracket 114 and the wire harness 102 directs the bracket 114 upward, the overmold 122 obstructs upward movement of the bracket 114 relative to the wire harness 102 through the top face 312 of the second arm 174. As depicted in FIG. 8, the first arm 172 includes a bottom face 314 oriented vertically downward, normal to the longitudinal direction of the bracket 114 such that when a force between the bracket 114 and the wire harness 102 directs the bracket 114 downward relative to the wire harness 102, the overmold 122 obstructs downward movement of the bracket 114 relative to the wire harness 102 through the bottom face 314 of the first arm 172. As also depicted in FIG. 6, the front face 224 of the first arm 172 is oriented forward in the longitudinal direction of the bracket 114 such that when a force between the bracket 114 and the wire harness 102 directs the bracket 114 forward relative to the wire harness 102, the overmold 122 obstructs forward movement of the bracket 114 relative to the wire harness 102 through the front face 224 of the first arm 172. As depicted in FIG. 9, the back face 230 of the first arm 172 is oriented backward in the longitudinal direction of the bracket 114 such that when a force between the bracket 114 and the wire harness 102 directs the bracket 114 backward relative to the wire harness 102, the overmold 122 obstructs backward movement of the bracket 114 relative to the wire harness 102 through the back face 230 of the first arm 172.

Similarly, as depicted in FIG. 6, the second arm 174 includes a top face 320 oriented vertically upward, normal to the longitudinal direction of the bracket 114 such that when a force between the bracket 114 and the wire harness 102 directs the bracket 114 upward, the overmold 122 obstructs upward movement of the bracket 114 relative to the wire harness 102 through the top face 320 of the second arm 174. As depicted in FIG. 8, the second arm 174 includes a bottom face 322 oriented vertically downward, normal to the longitudinal direction of the bracket 114 such that when a force between the bracket 114 and the wire harness 102 directs the bracket 114 downward relative to the wire harness 102, the overmold 122 obstructs downward movement of the bracket 114 relative to the wire harness 102. As also depicted in FIG. 6, the front face 234 of the second arm 174 is oriented forward in the longitudinal direction of the bracket 114 such that when a force between the bracket 114 and the wire harness 102 directs the bracket 114 forward relative to the wire harness 102, the overmold 122 obstructs forward movement of the bracket 114 relative to the wire harness 102. As depicted in FIG. 9, the back face 240 of the second arm 174 is oriented backward in the longitudinal direction of the bracket 114 such that when a force between the bracket 114 and the wire harness 102 directs the bracket 114 backward relative to the wire harness 102, the overmold 122 obstructs backward movement of the bracket 114 relative to the wire harness 102.

With reference to FIG. 6, the overmold 122 extends into the first hole 250 and the second hole 252 of the second plurality of holes, forming an interlock between the bracket 114 and the overmold 122. In this manner, the overmold 122 extends through the first hole 250 and the second hole 252 of the second plurality of holes from the lateral face 164 of the second wall 134, and connects with the overmold 122 at the medial face 170 of the second wall 134 so as to form a loop respectively through the first hole 250 and the second hole 252 of the second plurality of holes and around the second wall periphery 294.

According to one aspect, a method of fixedly securing the bracket 114 onto the wire harness 102 includes fixedly securing a first wall 132 of the bracket 114 to the wire harness 102 with an overmold 122, and fixedly securing the second wall 134 of the bracket 114 to the wire harness 102 with the overmold 122 such that the first wall 132 and the second wall 134 are disposed on opposite sides of the longitudinal plane 150 oriented longitudinally with respect to the wire harness 102 and bisecting the wire harness 102 where the bracket 114 is overmolded on the wire harness 102. In an embodiment, the method includes injecting the overmold 122 into at least one of the first hole 242 and the second hole 244 of the first plurality of holes and the first hole 520 and the second hole 252 of the second plurality of holes, forming an interlock between the bracket 114 and the overmold 122.

Figure 12:
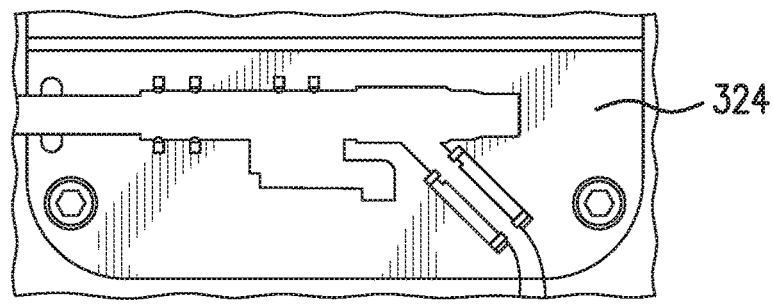
FIG. 12 is a top view of an injection molding machine configured for receiving a wire harness.
Figure 13:
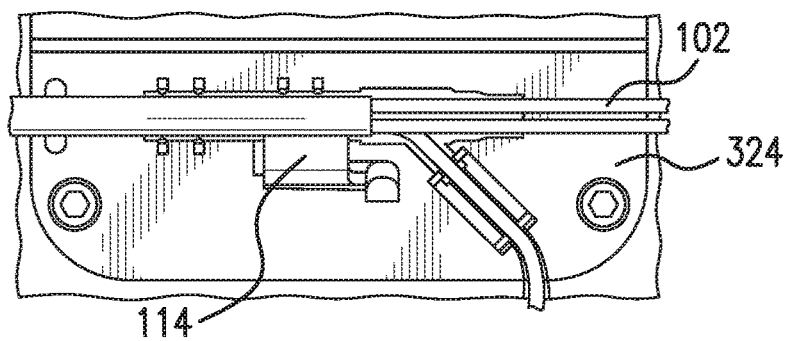
FIG. 13 is a top view of the injection molding machine with a wire harness disposed therein.
Figure 14:
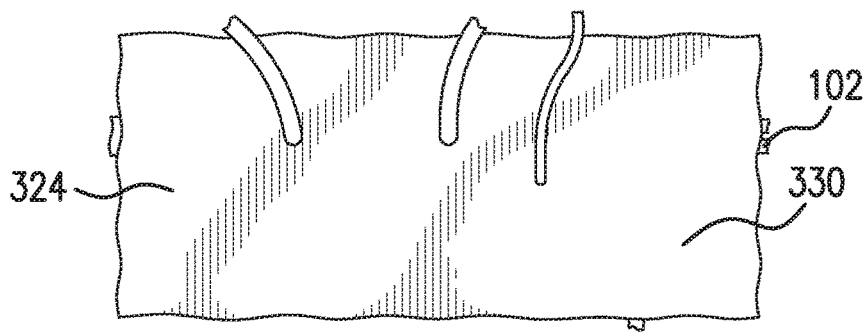
FIG. 14 is a top view of the injection molding machine covered with a top portion.
Figure 15:
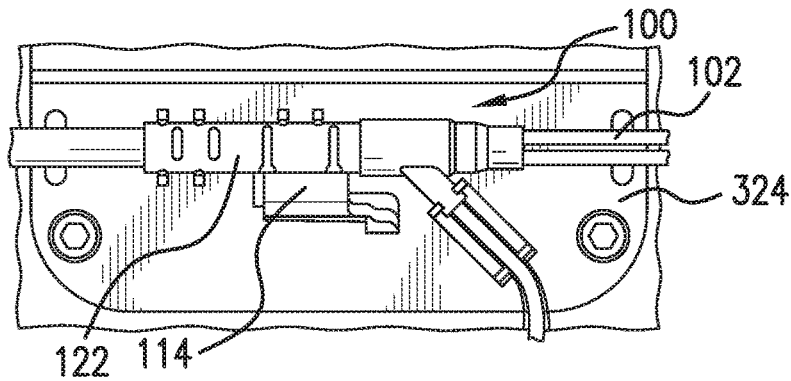
FIG. 15 is a top view of the injection molding machine with the wire harness assembly formed in the injection molding machine.

According to another aspect, as depicted in FIG. 12, a method of assembling the wire harness assembly 100 includes providing an injection molding machine 324 configured for receiving the wire harness 102 and the bracket 114. As depicted in FIG. 13, the method of assembling the wire harness assembly 100 includes disposing the wire harness 102 and the bracket 114 in the injection molding machine 324. As depicted in FIG. 14, the method of assembling the wire harness assembly 100 includes placing a cover 330 of the injection molding machine 324 on the injection molding machine 324 and injection molding the overmold 122 onto the wire harness 102 and the bracket 114. As shown in FIG. 15, the method of assembling a wire harness assembly 100 includes removing the cover 330 of the injection molding machine 324, enabling removal of the wire harness assembly 100 from the injection molding machine 324. In an embodiment, the overmold 122 is formed from polyurethane.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A wire harness assembly comprising:
a wire harness; and
a bracket fixedly secured to the wire harness by an overmold, the bracket including:
a first wall fixedly secured to and facing the wire harness from a first radial angle with respect to a centerline of the wire harness such that a first wall normal line directed normal from the first wall intersects the centerline of the wire harness where the first wall is fixedly secured to the wire harness;
a second wall fixedly secured to and facing the wire harness from a second radial angle with respect to the centerline of the wire harness such that a second wall normal line directed from the second wall intersects the centerline of the wire harness where the second wall is fixedly secured to the wire harness;
an arm having a proximal end that is connected to the first wall and continuous with a distal end of the arm, the distal end of the arm being connected to the second wall such that the arm is interposed between and separates the first wall from the second wall; and
a bend in the arm between the proximal end of the arm and the distal end of the arm, wherein the bend in the arm orients the first wall and the second wall toward facing the wire harness, wherein
the overmold encompasses at least a portion of the first wall including a first wall periphery and at least one of a lateral face of the first wall and a medial face of the first wall;
the overmold encompasses at least a portion of the second wall including a second wall periphery and at least one of a lateral face of the second wall and a medial face of the second wall;
the overmold encompasses at least a portion of the arm;
the overmold encompasses the wire harness where the bracket is fixedly secured to the wire harness by the overmold; and
the first wall and the second wall are located at a same longitudinal position of the wire harness such that the first normal line and the second normal line intersect a same point of the centerline of the wire harness.

2. The wire harness assembly according to claim 1, further comprising at least one hole defined in one of the first wall and the second wall,
wherein the overmold extends into the at least one hole, forming an interlock between the bracket and the overmold.

3. The wire harness assembly according to claim 2, wherein the at least one hole extends through the one of the first wall and the second wall, and
the overmold extends through the hole from a lateral face of the one of the first wall and the second wall, and connects with the overmold on a medial face of the one of the first wall and the second wall so as to form a loop through the hole and around one of the first wall periphery and the second wall periphery.

4. The wire harness assembly according to claim 1, wherein the first wall normal line extends from a flat section of the first wall, and the second wall normal line extends from a flat section of the second wall.

5. The wire harness assembly of claim 1, wherein the first wall and the second wall are disposed facing opposite sides of the wire harness such that the first wall normal line and the second wall normal line are collinear.

6. The wire harness assembly according to claim 1, wherein:
the first wall includes a first longitudinal end portion and a second longitudinal end portion disposed on a side of the bracket opposite the first longitudinal end portion with respect to a longitudinal length of the bracket;
the second wall includes a first longitudinal end portion and a second longitudinal end portion disposed on a side of the bracket opposite the first longitudinal end portion with respect to the longitudinal length of the bracket;
the arm is a first arm which connects the first longitudinal end portion of the first wall and the first longitudinal end portion of the second wall; and
the bracket includes a second arm that connects the second longitudinal end portion of the first wall and the second longitudinal end portion of the second wall.

7. The wire harness assembly according to claim 1, wherein the arm is a first arm and the bracket includes a second arm spaced from the first arm along a longitudinal length of the bracket, the bracket defining a cutout section between the first arm and the second arm along the longitudinal length of the bracket.

8. The wire harness assembly according to claim 7, wherein the first arm and the second arm are located on opposite sides of a lateral plane oriented laterally with respect to the bracket, the lateral plane bisecting at least one of the first wall and the second wall along the longitudinal length of the bracket such that the cutout section spans the lateral plane.

9. The wire harness assembly of claim 1, further comprising:
an attachment portion configured for attaching the bracket to a vehicle, the attachment portion extending from one of the first wall and the second wall, and extending outward from the overmold;
a mounting aperture defined in the attachment portion; and
a flange configured for being located on the vehicle and preventing the bracket from rotating about the mounting aperture with respect to the vehicle, the flange extending from the attachment portion and bent between the attachment portion and a distal end of the flange.

10. The wire harness assembly according to claim 1, wherein the bracket is formed from a single piece of material.

11. The wire harness assembly according to claim 1, wherein all portions of the overmold are integrally formed with each other from a single material.

12. A wire harness assembly comprising:
a wire harness; and
a bracket fixedly secured to the wire harness by an overmold, the bracket including:
a first wall fixedly secured to and facing the wire harness from a first radial angle with respect to a centerline of the wire harness such that a first wall normal line directed normal from the first wall intersects the centerline of the wire harness where the first wall is fixedly secured to the wire harness;
a second wall fixedly secured to and facing the wire harness from a second radial angle with respect to the centerline of the wire harness such that a second wall normal line directed from the second wall intersects the centerline of the wire harness where the second wall is fixedly secured to the wire harness;
an arm having a proximal end that is connected to the first wall and continuous with a distal end of the arm, the distal end of the arm being connected to the second wall such that the arm is interposed between and separates the first wall from the second wall; and
a bend in the arm between the proximal end of the arm and the distal end of the arm, wherein the bend in the arm orients the first wall and the second wall toward facing the wire harness, wherein
the overmold encompasses at least a portion of the first wall including a first wall periphery and at least one of a lateral face of the first wall and a medial face of the first wall;
the overmold encompasses at least a portion of the second wall including a second wall periphery and at least one of a lateral face of the second wall and a medial face of the second wall; and
the bend in the arm offsets the proximal end of the arm from the distal end of the arm by an angle that is equal in magnitude to a difference between the first radial angle and the second radial angle with respect to the centerline of the wire harness.

13. A wire harness assembly comprising:
a wire harness; and
a bracket fixedly secured to the wire harness by an overmold, the bracket including:
a first wall fixedly secured to the wire harness and facing the wire harness from a first radial angle with respect to a centerline of the wire harness such that a first wall normal line directed normal from the first wall intersects the centerline of the wire harness where the first wall is fixedly secured to the wire harness;
a second wall fixedly secured to the wire harness and facing the wire harness from a second radial angle with respect to the centerline of the wire harness such that a second wall normal line directed from the second wall intersects the centerline of the wire harness where the second wall is fixedly secured to the wire harness;
a first arm having a proximal end that is connected to the first wall and continuous with a distal end of the first arm, the distal end of the first arm being connected to the second wall such that the first arm is interposed between and separates the first wall from the second wall; and
a second arm having a proximal end that is connected to the first wall and continuous with a distal end of the second arm, the distal end of the second arm being connected to the second wall such that the second arm is interposed between and separates the first wall from the second wall, wherein
the first arm and the second arm are spaced from each other along a longitudinal length of the bracket, defining a cutout section therebetween;
the first wall and the second wall are disposed on opposite sides of a longitudinal plane oriented longitudinally with respect to the wire harness and bisecting the wire harness where the bracket is fixedly secured on the wire harness; and
the overmold encompasses at least a portion of the first wall and the wire harness such that the first wall is fixedly secured to the wire harness, and the overmold encompasses at least a portion of the second wall and the wire harness such that the second wall is fixedly secured to the wire harness.

14. The wire harness assembly according to claim 13, further comprising at least one hole defined in each of the first wall and the second wall, wherein the overmold extends into the at least one hole, forming an interlock between the bracket and the overmold.

15. The wire harness assembly of claim 13, wherein the overmold extends into the cutout section, creating an interlock between the overmold and the bracket.

16. The wire harness assembly of claim 13, further comprising a bend in the at least one of the first arm and the second arm between the proximal end and the distal end of the at least one of the first arm and the second arm, wherein the bend in the at least one of the first arm and the second arm orients the first wall and the second wall toward the wire harness.

* * * * *